3,045,012

STEROIDS CONTAINING A 16/17-LACTONE RING
Paul Kurath, Waukegan, and John Wayne Cole, Deerfield, Ill., assignors to Abbott Laboratories, North Chicago, Ill., a corporation of Illinois
No Drawing. Filed June 2, 1960, Ser. No. 33,385
18 Claims. (Cl. 260—239.57)

The present invention relates to a new group of steroids. More particularly it relates to a new series of steroid lactones of the androstane and estrane series.

According to the present invention, compounds of the structure (I) 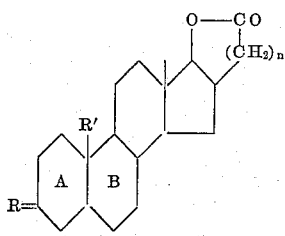

are provided in which R represents

or oxygen, R' represents hydrogen or methyl, n is an integer of 1 to 3 inclusive, and wherein the rings A and B may have the following partial structures:

(II) 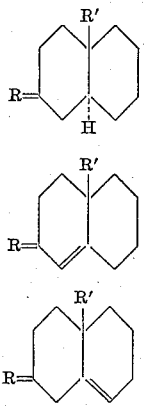

and

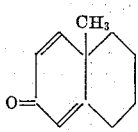

which could also be expressed as derivatives of 5α-androstane, 4-androstene, 5-androstene, or 1,4-androstadiene or the corresponding compounds in the estrane series.

The lactones of these structures have valuable hormonal activities. In particular they show positive androgenic activity with secondary effects on muscle growth, weight gain and salt balance. All of these new compounds are useful as endocrine agents.

The preparation of these lactones involves the new intermediates of the formulae (III) 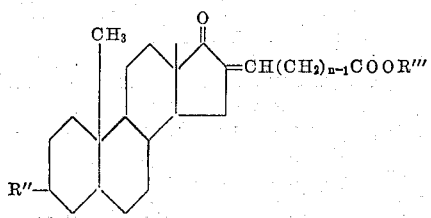

and (IV) 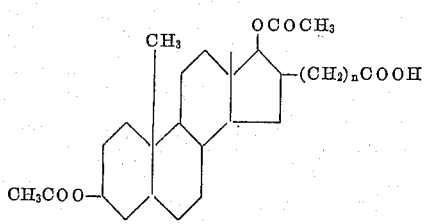

wherein n is an integer of 1 to 3 inclusive, R'' is acetoxy or hydroxy, R''' is hydrogen or methyl, and the A—B rings have the partial structures (V) 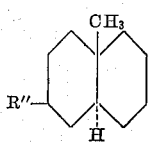

or

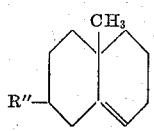

From a Compound III, the 17-oxo group and double bond at position 16 can be hydrogenated and the corresponding 17-hydroxy-16-carboxyalkyl compound may be lactonized under acidic conditions.

The oxoacid shown in Formula III with $n=1$ may be obtained by condensation of the known 17-oxosteroids with glyoxylic acid. Subsequent treatment of these oxoacids step-wise with thionyl chloride, diazomethane, and silver oxide according to the Arndt-Eistert procedure described in Fieser and Fieser, Organic Chemistry (1956), p. 184, converts them into the homologs ($n=2$) without affecting the remainder of structure III.

The preparation of the new intermediate and the production of the new compounds of the present invention are better described by references to the following examples which are meant to be illustrations only and do not constitute the only embodiments of the present invention. In all these examples, the reaction temperatures are about 25° C. unless stated otherwise. The term "1:9 hydrochloric acid" refers to 1 part of concentrated hydrochloric acid diluted with 9 parts of water.

EXAMPLE 1

*3β-Hydroxy-17-Oxo-5-Androstene-16-Ylidenacetic Acid*

To a cooled suspension of 17.12 g. of trisodium periodate (para) in 96 cc. of water and 1.6 cc. of concentrated sulfuric acid is added a solution of 12 g. of d-tartaric acid in 15 cc. of water. After 5 minutes the cooling bath is removed and the mixture is stirred for another 25 minutes. To this is added, in sequence, 23.04 g. of 3β-hydroxy-17-oxo-5-androstene, a solution of 12 g. of sodium hydroxide in 216 cc. of water, and 200 cc. of methanol. The reaction mixture is stirred overnight and subsequently 1 hour at 80° C. After cooling, it is diluted with 700 cc. of water and extracted with ether to remove neutral by-products. The residual alkaline layer is acidified and the precipitate is isolated by filtration and washed with water. After recrystallization from methanol/water, a yield of 21.8 g. (79% of theory) of 3β-hydroxy-17-oxo-5-androstene-16-ylidenacetic acid is obtained with a melting point of 239–41° C. After further recrystallization, the melting point is 241–2° C. The product has an empirical formula of $C_{21}H_{28}O_4$. The analysis shows the following values (with the theoretical amounts shown in parentheses): 73.29% C (73.23), 8.25% H (8.19), and 18.78% O (18.58). The ultra-violet absorption value is $$\lambda_{max.}^{MeOH} = 239 \text{ m}\mu \text{ } (\epsilon = 12,700)$$

EXAMPLE 2

*3β-Acetoxy-17-Oxo-5-Androstene-16-Ylidenacetic Acid*

A solution of 5 g. of 3β-hydroxy-17-oxo-5-androstene-16-ylidenacetic acid (from Example 1) in 30 cc. of pyridine and 15 cc. of acetic anhydride is allowed to stand overnight. Following the addition of 15 cc. of water to this solution, the latter is warmed on a steam bath for one hour. After cooling, the solution is poured onto about 250 g. of ice and is acidified with hydrochloric acid, and the resulting slurry is extracted with ether. The ether layer is first washed with 1:9 hydrochloric acid and then with water and dried over anhydrous magnesium sulfate. After evaporation of the ether, 5.3 g. of the crude 3β-acetoxy-17-oxo-5-androstene-16-ylidenacetic acid is obtained. The product is recrystallized once from methanol to yield 4.54 g. of pure material melting at 265–7° C. Further recrystallizations result in an analytical sample melting at 271–3° C. The compound has an ultra-violet absorption maximum of 239 m$\mu$ ($\epsilon$=11,970) in methanol and shows the following analytical values (with the theoretical amounts for the compound of the empirical formula $C_{23}H_{30}O_5$ shown in parentheses): 71.51% C (71.48); 7.90% H (7.82); 20.56% O (20.70).

EXAMPLE 3

*3β - Hydroxy-17-Oxo-5-Androstene-16-Ylidenacetic Acid Methyl Ester; 3β - Acetoxy-17-Oxo-5-Androstene-16-Ylidenacetic Acid Methyl Ester*

A mixture of 7.5 g. of 3β-hydroxy-17-oxo-5-androstene-16-ylidenacetic acid (from Example 1), 75 cc. of methanol, 2 cc. of concentrated hydrochloric acid, and 7.5 cc. of 2,2-dimethoxypropane is warmed to 50° C. while three portions of 7.5 cc. each of 2,2-dimethoxypropane are subsequently added at intervals of one hour. After allowing the mixture to remain at 50° C. overnight, the solvent is removed under reduced pressure and the resulting solid is recrystallized from acetone/Skellysolve C (a petroleum fraction consisting essentially of n-heptane, boiling at 90–100° C.) to give 6.20 g. of 3β-hydroxy-17-oxo-5-androstene-16-ylidenacetic acid methyl ester, melting at 140–1° C. The analytical sample melting at 141–2° C. shows the following values (with the theoretical values for $C_{22}H_{30}O_4$ shown in parentheses): 73.86% C (73.71) and 8.65% H (8.44).

A portion of 3.20 g. of this methyl ester is acetylated with acetic anhydride in pyridine in the usual manner. The resulting compound, 3β-acetoxy-17-oxo-5-androstene-16-ylidenacetic acid methyl ester, is recrystallized from methanol/water to yield 2.91 g. of the pure compound melting at 147–8° C. An analytical sample melting at 148–9° C. shows the following values (with the theoretical amounts shown in parentheses): 71.97% C (71.97) and 8.05% H (8.05).

EXAMPLE 4

*3β,17β-Dihydroxy-5-Androstene-16-Ylidenacetic Acid*

A solution of 10.2 g. of sodium borohydride in 35 cc. of water is added from a dropping funnel to an ice-cooled solution of 25.5 g. of 3β-hydroxy-17-oxo-5-androstene-16-ylidenacetic acid (from Example 1) in 1200 cc. of methanol and the funnel is once rinsed with 10 cc. of water. The mixture first is kept in the cooling bath for 30 minutes, is then allowed to warm to room temperature with occasional shaking of the vessel, and finally is refluxed for 30 minutes. After cooling, 240 cc. of 25% sodium hydroxide solution is added and most of the methanol is evaporated under reduced pressure. The resulting slurry is acidified with dilute hydrochloric acid and the residue is filtered and washed with water. After drying the product at 75° C. in vacuum, it is recrystallized from methanol, giving a first crop of 19.20 g. of 3β,17β-dihydroxy-5-androstene-16-ylidenacetic acid melting at 310–12° C. with decomposition plus a second crop of 2.74 g. melting at 309–11° C. with decomposition. The analysis of this compound shows the following values (with the theoretical values for $C_{21}H_{30}O_4$ given in parentheses): 72.76% C. (72.80), and 8.87% H (8.73). The analytical sample melts at 311–12° C. with decomposition and has an ultra-violet absorption of $$\lambda_{max.}^{MeOH} \text{ of } 220 \text{ m}\mu \text{ } (\epsilon = 12,500)$$

EXAMPLE 5

*3β,17β-Diacetoxy-5-Androstene-16-Ylidenacetic Acid*

A solution of 27.92 g. of 3β,17β-dihydroxy-5-androstene-16-ylidenacetic acid (from Example 4) in 180 cc. of anhydrous pyridine and 90 cc. of acetic anhydride is allowed to stand overnight. After careful addition of 90 cc. of water to this reaction mixture, the latter is warmed on a steam bath for 2 hours. The mixture is cooled and poured into 1600 cc. of ice water. The residue is filtered and washed several times with water and recrystallized from methanol/water to give a first crop of 32.98 g. of 3β,17β-diacetoxy-5-androstene-16-ylidenacetic acid melting at 209–11° C. An analytical sample melting at 210–12° C. shows the following values (with the theoretical amounts given in parentheses): 70.02% C. (69.74); 8.12% H (7.96); 22.04% O (22.30).

EXAMPLE 6

*3β,17β-Diacetoxy-5-Androstene-16β-Ylacetic Acid*

A solution of 8.62 g. of 3β,17β-diacetoxy-5-androstene-16-ylidenacetic acid (from Example 5) in 150 cc. of glacial acetic acid is hydrogenated in the presence of 0.17 g. of platinum oxide until about 110% of the theoretical amount of hydrogen for one double bond is absorbed. The solution is filtered and evaporated to dryness in vacuum. The crystalline residue is recrystallized twice from acetone/Skellysolve C to yield 4.19 g. of 3β,17β-diacetoxy-5-androstene-16β-ylacetic acid melting at 251–3° C. Upon concentration of the mother liquors, an additional 1.46 g. of crystalline material melting at 220–6° C. is obtained. An analysis shows the following values (given with the theoretical amounts for $C_{25}H_{36}O_6$ in parentheses): 69.44% C (69.42), 8.57% H (8.39), and 22.18% O (22.19). The analytical sample melts at 252–3° C. and shows no ultra-violet absorption maximum at 220 m$\mu$.

EXAMPLE 7

*3β,17β-Diacetoxy-5α-Androstane-16β-Ylacetic Acid*

A solution of 4.31 g. of 3β,17β-diacetoxy-5-androstene-16-ylidenacetic acid described in Example 5 in 150 cc. of glacial acetic acid is hydrogenated to completion with gaseous hydrogen in the presence of 0.43 g. of platinum oxide to yield 3β,17β-diacetoxy-5α-androstane-16β-ylacetic acid after following the procedure of Example 6. It is recrystallized twice from methanol/water to yield 2.85 g. material melting at 242–4° C. An analytical sample melting at 243–4° C. gives the following values (the amounts calculated for $C_{25}H_{38}O_6$ are given in parentheses); 69.38% C (69.09) and 8.93% H (8.82).

By reducing 3β,17β-diacetoxy-5-androstene-16β-ylacetic acid (Example 6) to completion, a yield of 80% of 3β,17β-diacetoxy-5α-androstane-16β-ylacetic acid is obtained.

EXAMPLE 8

*3β,17β-Dihydroxy-5α-Androstane-16β-Ylacetic Acid Lactone*

A solution of 2.76 g. of the compound of Example 7 and 3.19 g. of potassium hydroxide pellets in 12 cc. of water and 120 cc. of methanol is refluxed for 2 hours. The resulting solution is diluted with 400 cc. of water and subsequently concentrated under vacuum to about 180 cc. To the resulting aqueous slurry 440 cc. of water is added. This dilute slurry is acidified with 300 cc. of 1:9 hydrochloric acid. After warming this suspension on a steam bath for 15 minutes, it is cooled, and filtered. The residue is washed with several portions of water and dried overnight in vacuum at 75° C. to give a first crop of 1.56 g. of 3β,17β-dihydroxy-5α-androstane-16β-ylacetic acid lactone melting at 233–5° C. and a second crop of 0.18 g. melting at 229–31° C. after the above filtrate is further concentrated. The compound is recrystallized from acetone and shows then a melting point of 236–7° C. The analytical values for the compound of the empirical formula $C_{21}H_{32}O_3$ are: 75.98% C (75.86), 9.68% H (9.71), and 14.55% O (14.44).

EXAMPLE 9

*17β-Hydroxy-3-Oxo-5α-Androstane-16β-Ylacetic Acid Lactone*

A warm solution of 2.9 g. of 3β,17β-dihydroxy-5α-androstane-16β-ylacetic acid lactone described in Example 8 in 155 cc. of benzene is drop-wise added to a vigorously stirred, cooled solution of 4.62 g. of sodium dichromate in 20 cc. of water, 6.3 cc. of concentrated sulfuric acid, and 3.4 cc. of acetic acid. The mixture is stirred 20 hours at room temperature and the two layers formed after standing are separated. The aqueous phase is extracted twice with about 100 cc. of benzene each and this extract is combined with the above organic phase. The combined benzene solutions are washed with water, dried, and the solvent removed by evaporation to dryness to leave 2.73 g. of colorless, crystalline 17β-hydroxy-3-oxo-5α-androstane-16β-ylacetic acid lactone. It is recrystallized from acetone to give 2.09 g. of the purified lactone melting at 222–4° C. Upon further purification a sample, melting at 223–4° C. is analyzed and shows 76.36% C, and 9.38% H corresponding to the formula $C_{21}H_{30}O_3$ with the calculated values of 76.33% C, and 9.15% H.

EXAMPLE 10

*3β,17β-Dihydroxy-5-Androstene-16β-Ylacetic Acid Lactone*

A solution of 3.0 g. of the diacetate described in Example 6, 3.75 g. of potassium hydroxide pellets, 13 cc. of water, and 130 cc. of methanol is refluxed for 2 hours. The mixture is then diluted with water (350 cc. of) and the solution is concentrated to about 180 cc. The resulting slurry is diluted with 500 cc. of water and acidified with 340 cc. of 10% hydrochloric acid. The precipitate obtained is filtered, washed with several portions of water, and dried overnight in vacuum at 75° C. Recrystallization from acetone gives 1.89 g. of 3β,17β-dihydroxy-5-androstene-16β-ylacetic acid lactone melting at 236–9° C. and a second crop of 0.31 g. of the same material melting at 226–8° C. is isolated from the concentrated mother liquor. The analysis of a sample melting at 237–9° C. shows the following values (given with the theoretical values for $C_{21}H_{30}O_3$ in parentheses): 76.44% C (76.33), and 9.22% H (9.15).

EXAMPLE 11

*17β-Hydroxy-3-Oxo-4-Androstene-16β-Ylacetic Acid Lactone*

A solution of 1.8 g. of the lactone of Example 10 in 80 cc. of glacial acetic acid is treated successively for 2 hours each with 0.80 g. of bromine in 8 cc. of acetic acid, with 0.73 g. of chromic anhydride in 1.5 cc. of water and 11 cc. of acetic acid, and with 70 cc. of normal, aqueous chromous chloride under a nitrogen atmosphere. After two hours, the reaction mixture is diluted with 700 cc. of water and the precipitate is filtered and washed with several portions of water. After drying overnight at 55° C. in vacuum, it is recrystallized from acetone to yield 1.15 g. of 17β-hydroxy-3-oxo-4-androstene-16β-ylacetic acid lactone melting at 250–2° C. A recrystallized sample, melting at 251–3° C. shows the following analytical values (with the values for $C_{21}H_{28}O_3$ given in parentheses): 76.76% C (76.79), and 8.67% H (8.59).

EXAMPLE 12

*17β-Hydroxy-3-Oxo-1,4-Androstadiene-16β-Ylacetic Acid Lactone*

(a) A mixture of 2 g. of 17β-hydroxy-3-oxo-4-androstene-16β-ylacetic acid lactone (from Example 11), 0.80 g. of freshly sublimed selenium dioxide, and 0.4 cc. of glacial acetic acid in 40 cc. of tertiary butyl alcohol is stirred under reflux for 5 hours. After the addition of 0.25 g. more selenium dioxide, stirring and refluxing are continued for 18 hours after which time the reaction mixture is allowed to cool. The residue is removed by filtration and washed with several portions of a total of 30 cc. of tertiary butyl alcohol, the washing liquors being combined with the filtrate. The combined filtrates are evaporated to dryness under reduced pressure and the residue (2.475 g.) is dissolved in 200 cc. of methylene chloride. The turbid solution is filtered and the filtrate is washed first with 1:9 hydrochloric acid and then with water. The resulting yellow methylene chloride solution is dried over anhydrous magnesium sulfate. After removal of the drying agent, the solution is evaporated to dryness, leaving a residue of 2.242 g. of crude 17β-hydroxy-3-oxo-1,4-androstadiene-16β-ylacetic acid lactone, which is further purified by chromatography on 100 g. of silica gel. The ether/acetone (9:1) eluates give, after evaporation of the solvent, a total of 1.018 g. of partly crystalline material. Two recrystallizations from acetone/Skellysolve C produce 0.478 g. of pale, yellow crystals melting at 231–3° C. Upon further concentration of the mother liquors, a second crop of 315 mg. of the same compound, melting at 229–31° C., is isolated. A small sample of the first crop is sublimed under high vacuum at 180–210° C. and subsequently recrystallized three times from acetone/Skellysolve C. This sample, melting at 238–9° C., analyzes to the following values (the theoretical amounts for $C_{21}H_{26}O_3$ given in parentheses): 77.36% C (77.27) and 7.91% H (8.03). The ultra-violet absorption maximum in methanol is at 243 mµ ($\epsilon$=16,900).

(b) A solution of 2 g. of 17β-hydroxy-3-oxo-5α-androstane-16β-ylacetic acid (from Example 9) in 30 cc. of glacial acetic acid is treated first, for about 10 minutes, with 3.04 g. of a 30% hydrogen bromide solution in acetic acid, and subsequently, for about 5 minutes, with 2.092 g. of bromine in 8 cc. of acetic acid at 15° C. with stirring. The reaction mixture is then stirred 15 minutes at room temperatures and 230 cc. of water are added thereto. The precipitate is collected on a filter, washed several times with small amounts of water, and re-dissolved in benzene. The benzene solution is washed with water and the benzene is evaporated under reduced pressure. The crystalline residue of the crude dibromide is dissolved in 25 cc. of N,N-dimethylformamide and added to a suspension of 3.02 g. of lithium carbonate in 45 cc. of N,N-dimethylformamide at 95° C. under a nitrogen atmosphere. The mixture is stirred overnight at 95° C., subsequently cooled and diluted with 200 cc. of water and 50 cc. of 2 N hydrochloric acid. The solution is extracted with three portions of 150 cc. each of methylene chloride. The organic phase is washed with water until neutral, dried, and concentrated, to yield 1.775 g. of a yellow, crystalline residue which is purified by chromatography on 90 g. of silica. From the ether/acetone (9:1) eluates a total of 1.236 g. of 17β-hydroxy-3-oxo-1,4-androstadiene-16β-ylacetic acid lactone is obtained which, upon recrystallization from acetone/Skellysolve C gives 1.002 g. of pure material melting at 237–9° C. A second crop of 0.205 g., melting at 235–7° C. is obtained from the mother liquor. An analytical sample, melting at 239–40° C., shows 77.49% C and 8.09% H. Ultra-violet and infrared spectra are identical to those of the compound described in (a).

EXAMPLE 13

*3-(3β,17β-Dihydroxy - 5 - Androstene-16β-yl)Propionic Acid Lactone and 4-(3β,17β-Dihydroxy-5-Androstene-16β-yl)Butyric Acid Lactone*

(a) The 3β,17β-diacetoxy-5-androstene - 16β-ylacetic acid described in Example 6 is converted by the Arndt-Eistert procedure (Fieser and Fieser, "Organic Chemistry," 1956, page 184) into 3-(3β,17β-diacetoxy-5-androstene-16β-yl)propionic acid. The new diacetoxy acid is hydrolyzed and lactonized to 3-(3β,17β-dihydroxy-5-androstene-16β-yl)propionic acid lactone as described in Example 10.

(b) In the same manner, 3-(3β,17β-diacetoxy-5-androstene-16β-yl)propionic acid described above is converted to 4-(3β,17β-diacetoxy-5-androstene-16β-yl)butyric acid. The diacetoxy acid is again hydrolyzed and lactonized by the procedure described in Example 10 to yield the ε-lactone of 4-(3β,17β-dihydroxy-5-androstene-16β-yl)butyric acid.

EXAMPLE 14

*3-(17β-Hydroxy-3-Oxo-4-Androstene-16β-yl)Propionic Acid Lactone*

A solution of 3-(3β,17β-dihydroxy-5-androstene-16β-yl)-propionic acid lactone of Example 13 is oxidized in the three-step procedure described in Example 11 to 3-(17β-hydroxy-3-oxo-4-androstene-16β-yl)-propionic acid lactone of the empirical formula $C_{22}H_{30}O_3$ of molecular weight 342.45.

EXAMPLE 15

*17β-Hydroxy-3-Oxo-4-Estrene-16β-Ylacetic Acid Lactone*

3-methoxy-17-oxo-1,3,5(10) - estratriene, commonly known as estrone methyl ether is condensed with glyoxylic acid in accordance with the procedure of Example 1 to yield 3-methoxy-17-oxo-1,3,5(10) - estratriene-16-ylidenacetic acid. The latter is reduced to the corresponding 17β-hydroxy compound by the procedure described in Example 4, and is acetylated to the 17β-acetoxy-3-methoxy-1,3,5(10)-estratriene-16-ylidenacetic acid, in accordance with Example 5. This compound is hydrogenated by the procedure of Example 6 to the corresponding 17β-acetoxy-3-methoxy-1,3,5(10)-estratriene-16β -ylacetic acid, which, in turn, is reduced with lithium and ammonia by the procedure of Wilds and Nelson (JACS 75, 5360 (1953)) to a lithium salt, which is treated with mineral acid to give 17β-hydroxy-3-oxo-4-estrene-16β-ylacetic acid lactone of molecular weight 314.41 corresponding to the empirical formula $C_{20}H_{26}O_3$.

EXAMPLE 16

*17β-Hydroxy-3-Oxo-5α-Estrane-16β-Ylacetic Acid Lactone*

The product of Example 15 is catalytically reduced to 17β-hydroxy-3-oxo-5α-estrane-16β-ylacetic acid lactone of molecular weight 316.42 corresponding to the empirical formula $C_{20}H_{28}O_3$.

EXAMPLE 17

*3β,17β-Dihydroxy-5α-Estrane-16β-Ylacetic Acid Lactone*

The product of Example 16 is reduced with sodium borohydride and 3β,17β-dihydroxy-5α - estrane-16β-ylacetic acid lactone is separated by careful acidification. It has a molecular weight of 318.44 corresponding to the empirical formula $C_{20}H_{30}O_3$.

EXAMPLE 18

*3β,17β-Dihydroxy-4-Androstene-16β-Ylacetic Acid Lactone*

The product of Example 11 is reduced with sodium borohydride and the reaction product, 3β,17β-dihydroxy-4-androstene-16β-ylacetic acid lactone, is separated by careful acidification. It has a molecular weight of 330.44 corresponding to the empirical formula $C_{21}H_{30}O_3$.

EXAMPLE 19

*17β-Hydroxy-3-Oxo-5-Androstene-16β-Ylacetic Acid Lactone*

The compound prepared in Example 10 is oxidized under buffered conditions to 17β-hydroxy-3-oxo-5-androstene-16β-ylacetic acid lactone of molecular weight 328.43 corresponding to the empirical formula $C_{21}H_{28}O_3$.

EXAMPLE 20

*3β,17β-Dihydroxy-5-Estrene-16β-Ylacetic Acid Lactone*

The product of Example 15 is reduced with sodium borohydride and then acidified with a mineral acid. The obtained 3β,17β-dihydroxy-5-estrene-16β-ylacetic acid lactone has a molecular weight of 316.42 corresponding to the empirical formula $C_{20}H_{28}O_3$.

EXAMPLE 21

*3β,17β-Dihydroxy-4-Estrene-16β-Ylacetic Acid Lactone*

17β-hydroxy-3-oxo-4-estrene-16β-ylacetic acid lactone is reduced with sodium borohydride and the newly formed product, 3β,17β-dihydroxy-4-estrene-16β-ylacetic acid lactone, is separated by careful acidification. It has a molecular weight of 316.42 corresponding to the empirical formula $C_{20}H_{28}O_3$.

EXAMPLE 22

*17β-Hydroxy-3-Oxo-5-Estrene-16β-Ylacetic Acid Lactone*

3β,17β-dihydroxy-5-estrene-16β-ylacetic acid lactone is oxidized under buffered conditions to 17β-hydroxy-3-oxo-5-estrene-16β-ylacetic acid lactone of molecular weight 314.41 corresponding to the empirical formula $C_{20}H_{26}O_3$.

EXAMPLE 23

*3-(3β,17β-Dihydroxy-5α-Androstane-16β-yl)Propionic Acid Lactone*

3-(3β,17β-dihydroxy - 5α - Androstane-16β-yl)propionic acid lactone is catalytically reduced to 3-(3β,17β-dihydroxy-5α-androstane-16β-yl)propionic acid lactone of molecular weight 346.49 corresponding to the empirical formula $C_{22}H_{34}O_3$.

EXAMPLES 24–46

These examples, all listed in Table I, are carried out according to procedures given in details above. The processes used to get to these materials are listed in the column headed by "Process," the starting materials are referred to in the column headed by "Material." All new compounds are listed with full names with the exception of the terms X and Y which refer to the endings "-16β-yl)propionic acid lactone" and "-16β-yl)-n-butyric acid lactone" respectively.

TABLE I

| Ex. | Lactone | Process | Material |
|---|---|---|---|
| 24 | 3-(17β-Hydroxy-3-oxo-5-α-androstane-X | 9 | 23 |
| 25 | 3-(17β-Hydroxy-3-oxo-4-estrene-X | 15+13+15 | (1) |
| 26 | 3-(3β,17β-Dihydroxy-5-estrene-X | 20 | 25 |
| 27 | 3-(17β-Hydroxy-3-oxo-5α-estrane-X | 16 | 25 |
| 28 | 3-(3β,17β-Dihydroxy-5α-estrane-X | 17 | 27 |
| 29 | 3-(17β-Hydroxy-3-oxo-4-androstene-X | 11 | 13a |
| 30 | 3-(3β,17β-Dihydroxy-4-androstene-X | 18 | 29 |
| 31 | 3-(3β,17β-Dihydroxy-4-estrene-X | 18 | 25 |
| 32 | 3-(17β-Hydroxy-3-oxo-5-androstene-X | 19 | 13a |
| 33 | 3-(17β-Hydroxy-3-oxo-5-estrene-X | 19 | 26 |
| 34 | 3-(17β-Hydroxy-3-oxo-1,4-androstadiene X. | 12 | 29 |
| 35 | 4-(17β-Hydroxy-3-oxo-4-estrene-Y | 25 | (2) |
| 36 | 4-(3β,17β-Dihydroxy-5-α-androstane-Y | 23 | 13b |
| 37 | 4-(17β-Hydroxy-3-oxo-5-α-androstane-Y | 9 | 36 |
| 38 | 4-(17β-Hydroxy-3-oxo-5α-estrane-Y | 16 | 35 |
| 39 | 4-3β,17β-Dihydroxy-5α-estrane-Y | 17 | 38 |
| 40 | 4-(17β-Hydroxy-3-oxo-4-androstene-Y | 11 | 13b |
| 41 | 4-(3β,17β-Dihydroxy-4-androstene-Y | 18 | 40 |
| 42 | 4-(3β,17β-Dihydroxy-5-estrene-Y | 20 | 35 |
| 43 | 4-(3β17β-Dihydroxy-4-estrene-Y | 18 | 35 |
| 44 | 4-(17β-Hydroxy-3-oxo-5-androstene-Y | 19 | 13b |
| 45 | 4-(17β-Hydroxy-3-oxo-5-estrene-Y | 19 | 42 |
| 46 | 4-(17β-Hydroxy-3-oxo-1,4-androstadiene Y. | 12 | 40 |

[1] Estrone methyl ether.
[2] Intermediate of 25.

To those skilled in the art it will be understood that in alkaline medium the lactones of the present invention will hydrolyze to the ionic form of the formula

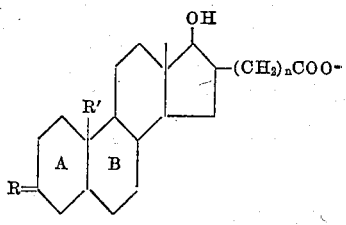

wherein R is oxygen or

R' is hydrogen or methyl, n is an integer from 1 to 3 inclusive, and the A—B rings have the partial structures of Formula II. These ionic forms are intended to be included within the scope of this invention. Thus, for convenience, these lactones may be used in the form of their alkali or earth alkali salts, e.g. sodium 3β,17β-dihydroxy-5α-androstane-16β-ylacetate, potassium 3-(17β-hydroxy-3-oxo-5-androstene-16β-yl)propionate, calcium 3β,17β-dihydroxy-4-estrene-16β-ylacetate, etc. These salts may be made by reacting the lactones with stoichiometric amounts of the desired base.

In all the above examples, the assigned structures were found to agree with the ultra-violet and infrared spectra. All melting points are determined in a Fisher-Johns melting point apparatus.

The steroid lactones of the present invention are all useful for hormonal activities in warm-blooded animals. Among these hormonal activities are androgenic, anabolic and diuretic effects.

For those skilled in the art it will be obvious that some of the above-listed compounds easily isomerize under certain conditions to other compounds also within the scope of the present invention and shown in the above examples, e.g. 3β,17β-dihydroxy-4-androstene-16β-ylacetic acid lactone rearranges under acidic conditions to 3β,17β-dihydroxy-5-androstene-16β-ylacetic acid lactone.

The important new intermediates characterized by Formulae III and IV are the 3β-hydroxy-17-oxo-5-androstene-16-ylidenacetic acid and its methyl ester, the 3β-acetoxy-17-oxo-5α-androstane-16-ylidenacetic acid and its methyl ester, the 3β-hydroxy-17-oxo-5α-androstane-16-ylidenacetic acid and its methyl ester, the 3β-acetoxy-17-oxo-5-androstene-16-ylidenacetic acid and its methyl ester, the 3-(3β-hydroxy-17-oxo-5-androstene-16-ylidene)propionic acid and its methyl ester, the 3-(3β-acetoxy-17-oxo-5α-androstane-16-ylidene)propionic acid and its methyl ester, the 3-(3β-hydroxy-17-oxo-5α-androstane-16-ylidene)propionic acid and its methyl ester, the 3-(3β-acetoxy-17-oxo-5-androstene-16-ylidene)propionic acid and its methyl ester, the 4-(3β-hydroxy-17-oxo-5-androstene-16-ylidene)-n-butyric acid and its methyl ester, the 4-(3β-acetoxy-17-oxo-5α-androstane-16-ylidene)-n-butyric acid and its methyl ester, the 4-(3β-hydroxy-17-oxo-5α-androstane-16-ylidene)-n-butyric acid and its methyl ester, the 4-(3β-acetoxy-17-oxo-5-androstene-16-ylidene)-n-butyric acid and its methyl ester, the 3β,17β-diacetoxy-5-androstene-16β-ylacetic acid, the 3β,17β-diacetoxy-5α-androstane-16β-ylacetic acid, the 3-(3β,17β-diacetoxy-5α-androstane-16β-yl)propionic acid, the 3-(3β,17β-diacetoxy-5-androstene-16β-yl)propionic acid, the 4-(3β,17β-diacetoxy-5-androstene-16β-yl)-n-butyric acid, and the 4-(3β,17β-diacetoxy-5α-androstane-16β-yl)-n-butyric acid.

Others may practice the invention in any of the numerous ways which will be suggested to one skilled in the art by the present disclosure. All such practice of the invention is considered to be a part hereof provided it falls within the scope of the appended claims.

We claim:
1. Steroid lactones of the formula

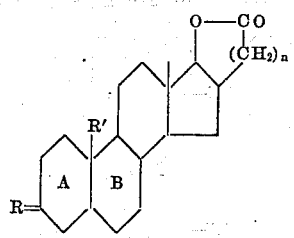

wherein n is an integer from 1 to 3 inclusive, R is selected from the group consisting of oxygen and

R' is selected from the group consisting of hydrogen and methyl, and wherein the A—B rings have a partial structure selected from the partial structures of the group consisting of

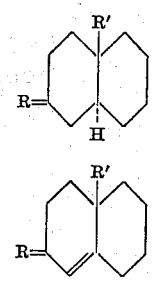

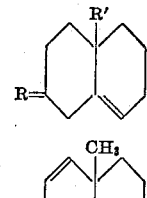

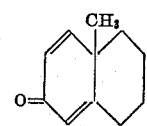

2. 3β,17β-dihydroxy-5α-androstane-16β-ylacetic acid lactone.
3. 3β,17β-dihydroxy-5-androstene-16β-ylacetic acid lactone.
4. 17β-hydroxy-3-oxo-5α-androstane-16β-ylacetic acid lactone.
5. 17β-hydroxy-3-oxo-4-androstene-16β-ylacetic acid lactone.
6. 17β-hydroxy-3-oxo-1,4-androstadiene-16β-ylacetic acid lactone.
7. 3-(17β-hydroxy-3-oxo-4-androstene-16β-yl)propionic acid lactone.
8. 17β-hydroxy-3-oxo-4-estrene-16β-ylacetic acid lactone.
9. Steroid intermediates of the formula

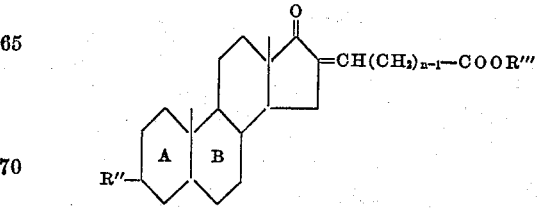

wherein n is an integer from 1 to 3 inclusive, R" is selected from the group of hydroxy and acetoxy, R''' is selected from the group of hydrogen and methyl, and wherein the A—B rings have a structure selected from the partial structures of the group consisting of

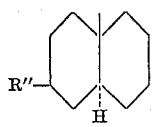

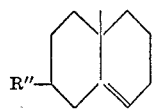

10. 3β-hydroxy-17-oxo-5-androstene-16-ylidenacetic acid.
11. 3β-acetoxy-17-oxo-5-androstene-16-ylidenacetic acid.
12. 3β-hydroxy-17-oxo-5-androstene-16-ylidenacetic acid methyl ester.
13. 3β-acetoxy-17-oxo-5-androstene-16-ylidenacetic acid methyl ester.
14. 3β,17β-dihydroxy-5-androstene-16-ylidenacetic acid.
15. 3β,17β-diacetoxy-5-androstene-16-ylidenacetic acid.
16. Steroid intermediates of the formula

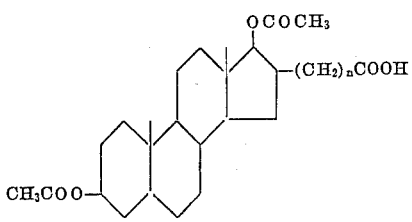

wherein $n$ is an integer from 1 to 3 inclusive, and wherein the A—B rings have a partial structure selected from the partial structures of the group consisting of

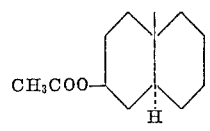

and

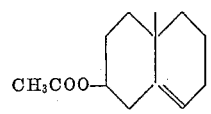

17. 3β,17β-diacetoxy-5α-androstane-16β-ylacetic acid.
18. 3β,17β-diacetoxy-5-androstene-16β-ylacetic acid.

References Cited in the file of this patent

Fieser et al.: Natural Products Related to Phenanthrene, p. 230 (1949), Reinhold Pub. Co., N.Y.
Fieser: J.A.C.S., vol. 75, p. 5421 (1953).
Lowewenthal: Tetrahedron, vol. 6, No. 4, page 295 (1959).

UNITED STATES PATENT OFFICE
CERTIFICATE OF CORRECTION

July 17, 1962

Patent No. 3,045,012

Paul Kurath et al.

It is hereby certified that error appears in the above numbered patent requiring correction and that the said Letters Patent should read as corrected below.

Column 6, line 50, for "230" read -- 250 --; column 8, line 37, for "5α-Androstane-" read -- 5-androstene- --; column 8, TABLE I, "Ex. 39", for "4-3β,17β-" read 4-(3β,17β- --; column 10, line 41, before the fourth structure, insert -- and --; column 11, line 7, before the second structure, insert -- and --.

Signed and sealed this 13th day of November 1962.

(SEAL)
Attest:

ERNEST W. SWIDER
Attesting Officer

DAVID L. LADD
Commissioner of Patents